United States Patent
Adams

(10) Patent No.: US 11,004,453 B2
(45) Date of Patent: May 11, 2021

(54) AVOIDING WAKE WORD SELF-TRIGGERING

(71) Applicant: Sensory, Incorporated, Santa Clara, CA (US)

(72) Inventor: Erich Adams, San Jose, CA (US)

(73) Assignee: Sensory, Incorporated, Santa Clara, CA (US)

( * ) Notice: Subject to any disclaimer, the term of this patent is extended or adjusted under 35 U.S.C. 154(b) by 0 days.

(21) Appl. No.: 15/945,014

(22) Filed: Apr. 4, 2018

(65) Prior Publication Data

US 2019/0311719 A1 Oct. 10, 2019

(51) Int. Cl.
| | |
|---|---|
| G10L 15/32 | (2013.01) |
| G10L 15/22 | (2006.01) |
| G10L 15/30 | (2013.01) |
| G10L 15/08 | (2006.01) |

(52) U.S. Cl.
CPC ............ *G10L 15/32* (2013.01); *G10L 15/08* (2013.01); *G10L 15/22* (2013.01); *G10L 15/30* (2013.01); *G10L 2015/223* (2013.01)

(58) Field of Classification Search
CPC ......... G10L 15/32; G10L 15/08; G10L 15/22; G10L 15/30; G10L 2015/223
See application file for complete search history.

(56) References Cited

U.S. PATENT DOCUMENTS

| | | | |
|---|---|---|---|
| 9,691,378 B1 * | 6/2017 | Meyers | G10L 15/08 |
| 10,186,265 B1 * | 1/2019 | Lockhart | G10L 15/22 |
| 2016/0155436 A1 * | 6/2016 | Choi | G10L 15/183 |
| | | | 704/232 |
| 2018/0366117 A1 * | 12/2018 | Carreras | G10L 15/20 |
| 2019/0057693 A1 * | 2/2019 | Fry | G10L 15/22 |

\* cited by examiner

*Primary Examiner* — Michelle M Koeth
(74) *Attorney, Agent, or Firm* — Fountainhead Law Group P.C.

(57) ABSTRACT

Techniques for avoiding wake word self-triggering are provided. In one embodiment, an electronic device can receive an audio-out signal to be output as audio via a speaker of the device and can attempt to recognize a wake word in the audio-out signal using a first recognizer. If the wake word is recognized in the audio-out signal, the electronic device can further determine whether a wake word match is made using a second recognizer with respect to a mic-in audio signal captured via a microphone of the device at approximately the same time that the audio-out signal is output via the speaker. If so, the electronic device can ignore the wake word match made using the second recognizer.

18 Claims, 5 Drawing Sheets

AVOIDING WAKE WORD SELF-TRIGGERING

BACKGROUND

In recent years, voice command-and-control has become a popular feature on electronic devices such as smartphones, tablets, media streaming devices, smart speakers, and so on. Generally speaking, this feature allows a user to interact with the device in a hands-free manner in order to access information and/or to control operation of the device. For example, according to one implementation, the user can say a predefined trigger word or phrase, known as a "wake word," immediately followed by a query or command phrase. The device will typically be listening for the wake word (using, e.g., conventional phrase spotting/speech recognition techniques) in an always-on modality. Upon detecting an utterance of the wake word, the device can cause the following query or command phrase to be processed, either locally on the device or remotely in the cloud. The device can then cause an appropriate action to be performed based on the content of the query or command phrase and can return a response to the user.

One limitation with existing voice command-and-control implementations is that, when listening for the wake word, they will occasionally make the mistake of recognizing audio output by the device itself as being an utterance made by a user. This may occur in scenarios where, for example, the audio waves generated by the device are reflected back by an object (e.g., the user's body or a nearby wall) to the device's microphone. If, in these instances, the audio output by the device includes the wake word or a word/phrase that sounds similar to the wake word, the voice command-and-control system may erroneously "self-trigger" (i.e., detect that the wake word was uttered and attempt to process a follow-on query/command, even though the wake word was generated by the device itself rather than spoken by a user). This wake word self-triggering can result in a frustrating user experience for end-users.

SUMMARY

Techniques for avoiding wake word self-triggering are provided. In one embodiment, an electronic device can receive an audio-out signal to be output as audio via a speaker of the device and can attempt to recognize a wake word in the audio-out signal using a first recognizer. If the wake word is recognized in the audio-out signal, the electronic device can further determine whether a wake word match is made using a second recognizer with respect to a mic-in audio signal captured via a microphone of the device at approximately the same time that the audio-out signal is output via the speaker. If so, the electronic device can ignore the wake word match made using the second recognizer.

A further understanding of the nature and advantages of the embodiments disclosed herein can be realized by reference to the remaining portions of the specification and the attached drawings.

DETAILED DESCRIPTION

In the following description, for purposes of explanation, numerous examples and details are set forth in order to provide an understanding of specific embodiments. It will be evident, however, to one skilled in the art that certain embodiments can be practiced without some of these details, or can be practiced with modifications or equivalents thereof.

1. Overview

The present disclosure describes techniques for avoiding wake word self-triggering in an electronic device that makes use of voice command-and-control. At a high level, these techniques involve implementing two separate wake word recognizers in the device: (1) a first recognizer that is configured to detect the wake word in audio signals received via the device's microphone, and (2) a second recognizer configured to detect the wake word in audio that is intended to be output by the device (e.g., audio received from the cloud). If the second recognizer detects the wake word in a particular audio segment that will be output by the device, the device can ignore any wake word matches that are made by the first recognizer at around the time that the audio segment is actually output by the device. In this way, the device can intelligently avoid wake word self-triggering, since it knows when it generates audio that includes the wake word (or something that sounds like the wake word) and thus can infer that any wake word utterances detected by the first recognizer during those time periods originate from the device rather than a user.

The foregoing and other aspects of the present disclosure are described in further detail in the sections that follow.

2. System Environment

Figure 1:
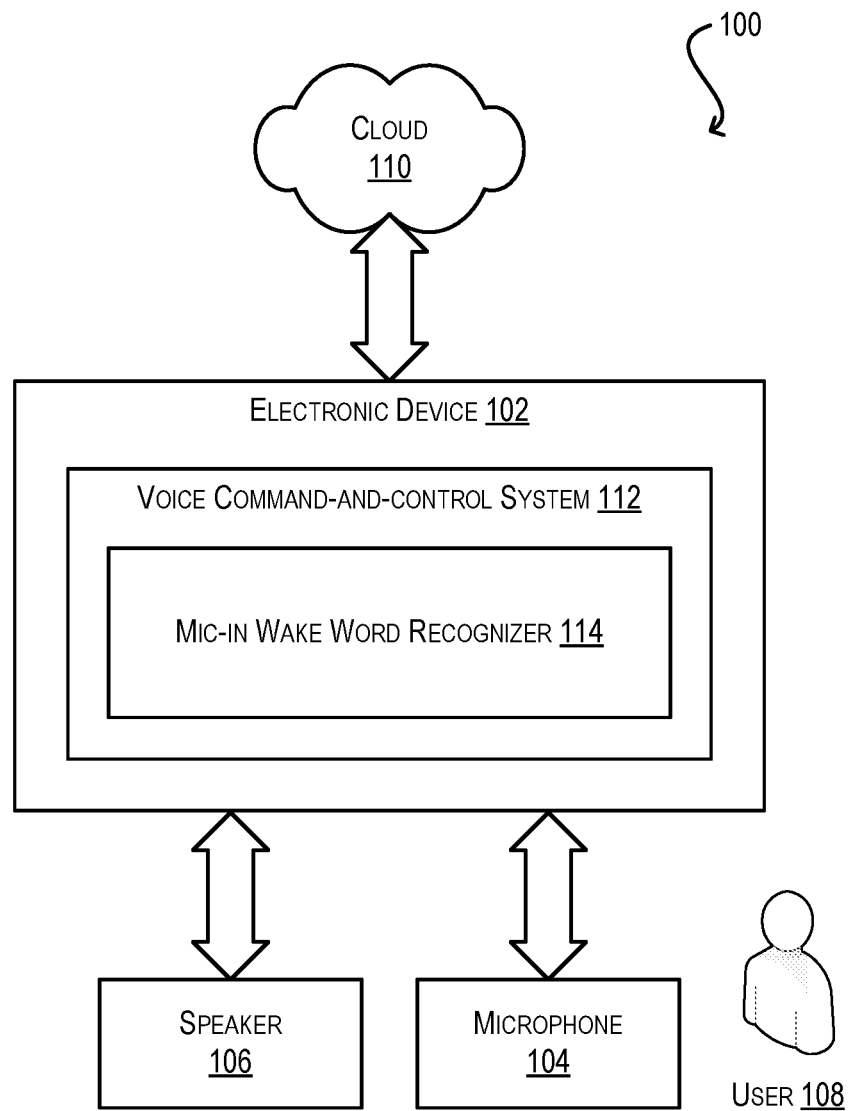
FIG. 1 depicts a system environment.

FIG. 1 is a simplified block diagram of a system environment 100 in which embodiments of the present disclosure may be implemented. As shown, system environment 100 includes an electronic device 102 that is communicatively coupled with a microphone 104 and a speaker 106. In one set of embodiments, electronic device 102 can be a handheld or wearable device, such as a smartphone, a tablet, a smartwatch, or the like. In other embodiments, electronic device 102 can be a larger or stationary device or system, such as a desktop computer, a television, a media streaming device, a video game console, a public kiosk, an in-vehicle computer system, a home automation or security system, or the like.

Microphone 104 is operable for capturing audio signals from its surrounding environment, such as speech uttered by a device user 108. Speaker 106 is operable for outputting audio from electronic device 102, such as audio signals generated locally on device 102 or audio signals received from one or more remote systems/servers (e.g., cloud 110). In one embodiment, microphone 104 and speaker 106 can be integrated directly into the physical housing of electronic device 102. In other embodiments, microphone 104 and/or speaker 106 may be resident in another device or housing that is separate from electronic device 102. For example, in a scenario where electronic device 102 is a home automation or security system, microphone 104 and speaker 106 may be placed at different locations or in different fixtures in a room. In this and other similar scenarios, audio data captured via microphone 104 and audio data output via speaker 106 can be relayed to/from electronic device 102 via an appropriate communications link (e.g., a wired or wireless link).

In addition to electronic device 102, microphone 104, and speaker 106, system environment 100 further includes a voice command-and-control system 112, which may run on electronic device 102 as shown in FIG. 1 or on another device/system such as a cloud-based server (not shown). According to one conventional approach, voice command-and-control system 112 can continuously monitor for a wake word by receiving audio signals captured via microphone 104 and processing the audio via a "mic-in" wake word recognizer 114 in order to determine whether the wake word has been uttered by device user 108. If mic-in wake word recognizer 114 detects the wake word as being uttered, system 112 can recognize and process one or more query/command phrases immediately following the wake word.

As noted the Background section, one problem with existing voice command-and-control implementations on electronic devices such as device 102 is that, in some circumstances, they can mistakenly self-trigger themselves on the wake word. For example, consider a scenario where device user 108 asks "What are you?" and device 102 responds with "My name is ABC," where ABC is the actual wake word used to trigger the voice command-and control functionality of the device. In this case, if the audio "My name is ABC" output from speaker 106 is somehow reflected to microphone 104, mic-in wake word recognizer 114 of voice command-and-control system 112 may misrecognize "ABC" as being spoken by a user (when it was in fact spoken by the device itself) and erroneously try to process a follow-on query or command phrase.

There are other scenarios in which this wake word self-triggering can happen. For instance, as part of a response to a user query or command, device 102 may output a word or phrase that sounds very similar to the wake word. In this case, even though the device has not output the actual wake word, mic-in wake word recognizer 114 may mistakenly detect the wake word and cause a self-trigger to occur.

Figure 2:
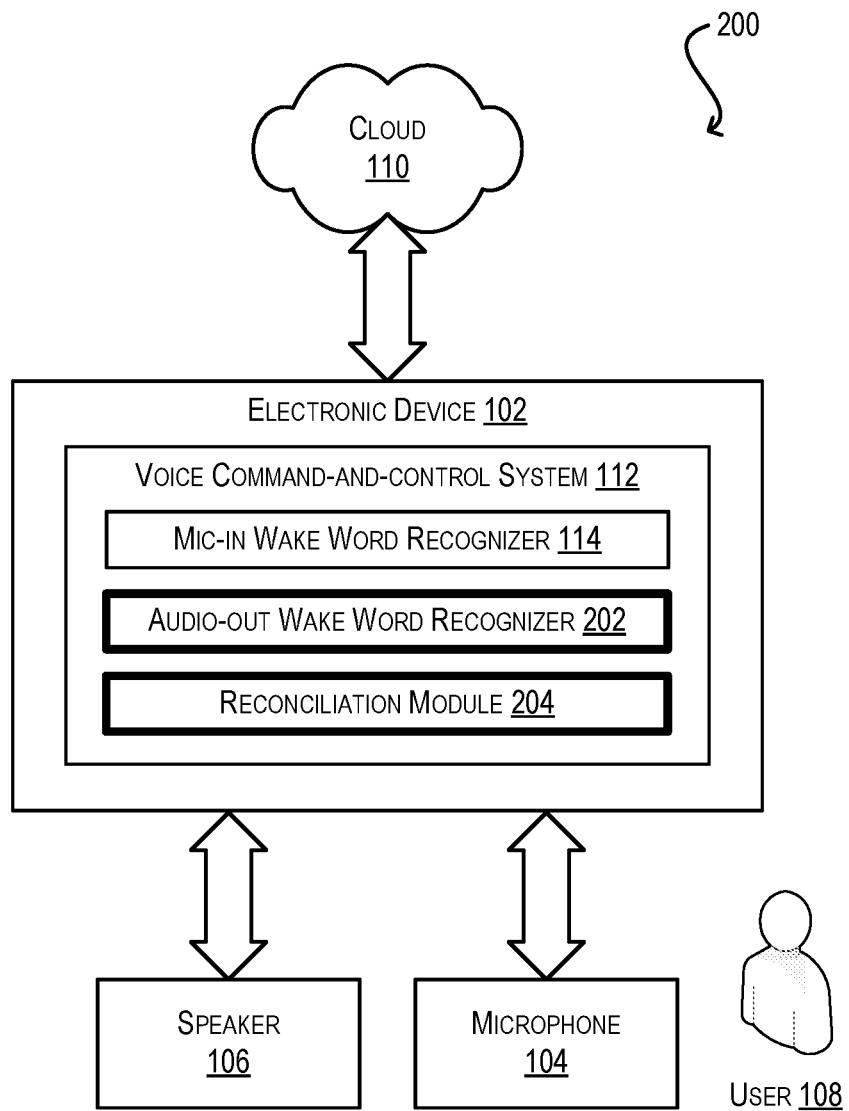
FIG. 2 depicts a system environment that implements the techniques of the present disclosure according to an embodiment.

To address the foregoing and other similar issues, FIG. 2 depicts an enhanced version of system environment 100 (i.e., system environment 200) that includes, within voice command- and control system 112, a second wake word recognizer (referred to as an "audio-out" recognizer) 202 and a reconciliation module 204. As described in further detail below, audio-out wake word recognizer 202 can run in parallel with mic-in wake word recognizer 114 but, rather than processing audio signals received via microphone 104, can process signals (referred to as "audio-out" signals) that are intended to be output by device 102 as audio via speaker 106. More particularly, audio-out wake word recognizer 202 can receive an audio-out signal, process the audio-out signal to determine whether it includes the wake word, and if so, provide an indication of this to reconciliation module 204. In one set of embodiments, the audio-out signal may be an audio signal/file that is sent from, e.g., cloud 110. In other embodiments, the audio-out signal may be an audio signal/file that is generated locally on device 102, and/or may include non-audio data (e.g., text data).

Upon receiving an indication from audio-out wake word recognizer 202 that the wake word has been detected in the audio-out signal, reconciliation module 204 can check the status of mic-in wake word recognizer 114 and determine whether recognizer 114 detects the wake word in the audio received via microphone 104 at approximately the same time that the audio-out signal is output via speaker 106. If yes, reconciliation module 204 can conclude that the wake word utterance detected via mic-in wake word recognizer 114 likely originated from the device itself and thus cause voice command-and-control system 112 to effectively ignore the wake word match made by recognizer 114 (i.e., do not prompt the use and decline to process a follow-on query/command). In this way, system 112 can intelligently avoid self-triggering itself based on the audio output from device 102, leading to a better user experience for device user 108.

In certain embodiments, to minimize the performance and power impact of implementing audio-out wake word recognizer 202, recognizer 202 may employ a smaller and/or more efficient speech recognition model (e.g., a model with fewer states/phonemes) than mic-in wake word recognizer 114. This is possible because, in cases where the audio-out signals processed by audio-out wake word recognizer 202 are signals received from cloud 110, such signals will typically be "clean" and not include background noise or exhibit other issues (e.g., static, uneven volume, etc.) that would complicate the recognition task. Accordingly, in these embodiments, audio-out wake word recognizer 202 can be implemented in a relatively efficient manner that does not consume significantly more power than existing voice command-and-control systems, and thus is well suited for low-power (e.g., mobile) devices.

It should be appreciated that system environment 200 of FIG. 2 is illustrative and not intended to limit embodiments of the present disclosure. For example, the various entities shown in FIG. 2 may be arranged according to different configurations, or may include subcomponents or functions that are not explicitly described. One of ordinary skill in the art will recognize other variations, modifications, and alternatives.

3. Workflows

Figure 3:
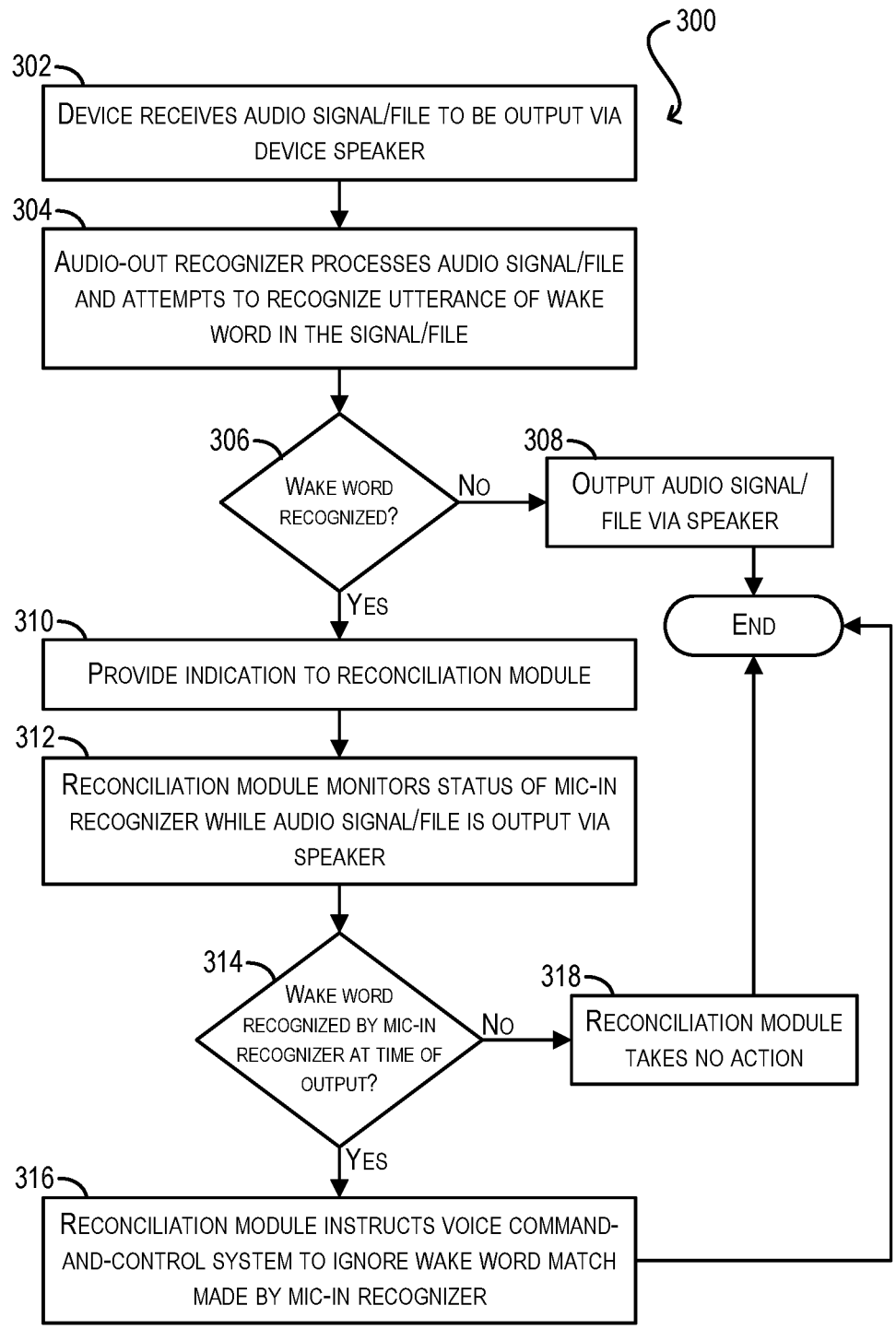
FIG. 3 depicts a first workflow for avoiding wake word self-triggering according to an embodiment.

FIG. 3 depicts a high-level workflow 300 that can be performed by electronic device 102 of FIG. 2 and its constituent components (e.g., recognizers 114 and 202 and reconciliation module 204) for avoiding wake word self-triggering according to an embodiment. Workflow 300 assumes that audio-out wake word recognizer 202 is an audio/speech recognizer and the audio-out signals processed by recognizer 202 are audio signals/files.

Starting with block 302, electronic device 102 can receive an audio signal/file to be output by device 102 via speaker 106. In one set of embodiments, electronic device 102 may generate this audio signal/file locally on the device. In other embodiments, electronic device 102 may receive this audio signal/file from a remote (e.g., cloud-based) server. In many cases, the audio signal/file will contain a response or acknowledgement to a voice query or command previously submitted by a user, such as device user 108.

At block 304, audio-out wake word recognizer 202 can process the audio signal/file received at block 302 and, as part of this processing, attempt to recognize an utterance of the wake word within the signal/file. Audio-out wake word recognizer 202 may use conventional phrase spotting techniques for this recognition task. As noted previously, in some embodiments, audio-out wake word recognizer 202 may employ a speech recognition model that is smaller and/or more efficient than, e.g., mic-in wake word recognizer 114 if the audio signal/file is a "clean" file that is free of any background noise or other auditory anomalies. This will typically be true if the audio signal/file is a computer-generated signal/file.

If audio-out wake word recognizer 202 does not detect the wake word in the audio signal/file at block 306, electronic device 102 can proceed with outputting the audio signal/file via speaker 106 (block 308) and workflow 300 can end.

However, if audio-out wake word recognizer 202 does detect the wake word at block 306, audio-out wake word recognizer 202 can provide an indication of this to reconciliation module 204 (block 310). In response, reconciliation module 204 can monitor the status of mic-in wake word recognizer 114 while the audio signal/file is output from device 102 via speaker 106 (block 312).

If reconciliation module 204 determines that mic-in wake word recognizer 114 detects the wake word in audio received via microphone 104 at approximately the same time that the audio signal/file is output via speaker 106 at block 314, reconciliation module 204 can conclude that the wake word utterance detected via recognizer 114 likely originated from the device itself. Thus, reconciliation module 204 can instruct voice command-and-control system 112 to ignore the wake word match made by mic-in wake word recognizer 114 (i.e., do not prompt the user and decline to process a follow-on query/command) (block 316).

On the other hand, if reconciliation module 204 determines that mic-in wake word recognizer 114 does not detect the wake word in audio received via microphone 104 at approximately the same time that the audio signal/file is output via speaker 106 at block 314, reconciliation module 204 can take no action (since there is no self-triggering in this case) (block 318) and workflow 300 can end.

Figure 4:
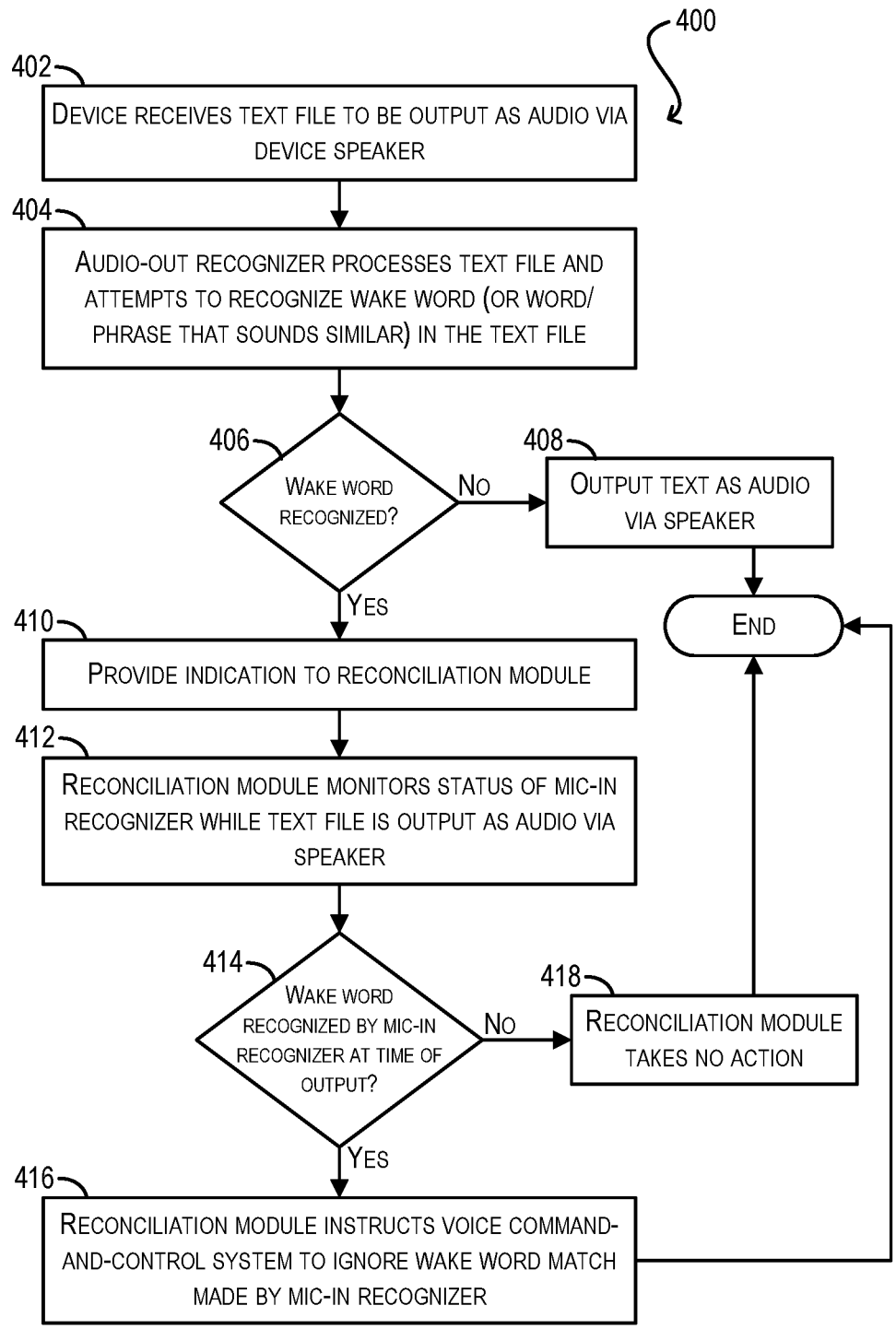
FIG. 4 depicts a second workflow for avoiding wake word self-triggering according to an embodiment.

FIG. 4 depicts a second high-level workflow 400 that can be performed by electronic device 102 of FIG. 2 and its constituent components (e.g., recognizers 114 and 202 and reconciliation module 204) for avoiding wake word self-triggering according to an embodiment. Workflow 400 is largely similar to workflow 300 of FIG. 3, and thus blocks 402-416 of workflow 400 generally correspond to blocks 302-316 of workflow 300. However, in workflow 400, the audio-out signal received by audio-out wake word recognizer 202 is a text file rather than an audio signal/file. Thus, at block 404, audio-out wake word recognizer 202 can process the text file using text recognition techniques to detect an occurrence of the wake word (or a word/phrase that sounds similar to the wake word) in that file.

4. Example Device Architecture

Figure 5:
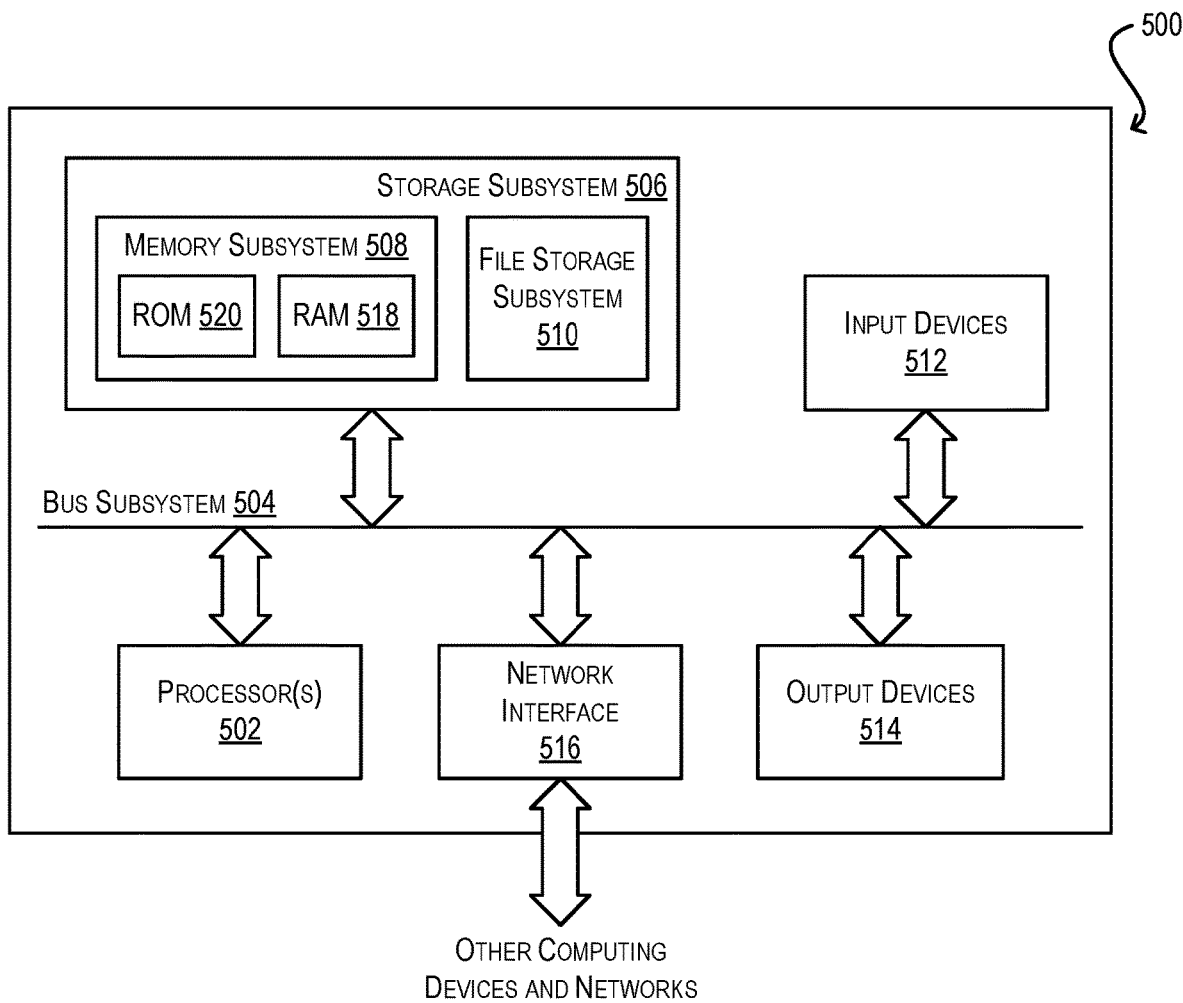
FIG. 5 depicts a computing device according to an embodiment.

FIG. 5 is a simplified block diagram of the architecture of an example computing device 500. This architecture may be used to implement, e.g., device 102 of FIG. 1. As shown, computing device 500 includes one or more processors 502 that communicate with a number of peripheral devices via a bus subsystem 504. These peripheral devices include a storage subsystem 506 (comprising a memory subsystem 508 and a file storage subsystem 510), input devices 512, output devices 514, and a network interface subsystem 516.

Bus subsystem 504 can provide a mechanism for letting the various components and subsystems of computing device 500 communicate with each other as intended. Although bus subsystem 504 is shown schematically as a single bus, alternative embodiments of the bus subsystem can utilize multiple buses.

Network interface subsystem 516 can serve as an interface for communicating data between computing device 500 and other computing devices or networks. Embodiments of network interface subsystem 516 can include wired (e.g., coaxial, twisted pair, or fiber optic Ethernet) and/or wireless (e.g., Wi-Fi, cellular, Bluetooth, etc.) interfaces.

Input devices 512 can include a camera, a touch-screen incorporated into a display, a keyboard, a pointing device (e.g., mouse, touchpad, etc.), an audio input device (such as microphone 104 of FIG. 1), and/or other types of input devices. In general, use of the term "input device" is intended to include all possible types of devices and mechanisms for inputting information into computing device 500.

Output devices 514 can include a display subsystem (e.g., a flat-panel display), an audio output device (e.g., such as speaker 106 of FIG. 1), and/or the like. In general, use of the term "output device" is intended to include all possible types of devices and mechanisms for outputting information from computing device 500.

Storage subsystem 506 includes a memory subsystem 508 and a file/disk storage subsystem 510. Subsystems 508 and 510 represent non-transitory computer-readable storage media that can store program code and/or data that provide the functionality of various embodiments described herein.

Memory subsystem 508 can include a number of memories including a main random access memory (RAM) 518 for storage of instructions and data during program execution and a read-only memory (ROM) 520 in which fixed instructions are stored. File storage subsystem 510 can provide persistent (i.e., non-volatile) storage for program and data files and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computing device 500 is illustrative and not intended to limit embodiments of the present invention. Many other configurations having more or fewer components than computing device 500 are possible.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted.

Further, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the disclosure as set forth in the following claims.

What is claimed is:

1. A method comprising:
   receiving, by an electronic device, an audio-out signal to be output as audio via a speaker of the electronic device;
   attempting, by a first recognizer of the electronic device, to recognize a wake word in the audio-out signal, the first recognizer being a recognizer that includes a first speech recognition model which comprises a first number of speech recognition states or phonemes; and
   upon recognizing, by the first recognizer, the wake word in the audio-out signal:

monitoring, by a reconciliation module of the electronic device, a status of a second recognizer while the audio-out signal is output via the speaker of the electronic device, wherein the second recognizer includes a second speech recognition model which comprises a second number of speech recognition states or phonemes higher than the first number;

determining, by the reconciliation module via the monitoring, that the second recognizer has detected the wake word in a mic-in audio signal captured via a microphone of the electronic device at approximately the same time that the audio-out signal was output via the speaker; and in response to the determining, transmitting, by the reconciliation module, an instruction to a voice command-and-control system of the electronic device to ignore the wake word detected in the mic-in audio signal by the second recognizer.

2. The method of claim 1 wherein the instruction causes the voice command-and-control system to decline processing of a voice query or command phrase following the wake word in the mic-in audio signal.

3. The method of claim 1 wherein the audio-out signal is an audio signal or file.

4. The method of claim 1 wherein the audio-out signal is a text file.

5. The method of claim 1 wherein the audio-out signal is generated locally on the electronic device.

6. The method of claim 1 wherein the audio-out signal is received by the electronic device from a remote server.

7. A non-transitory computer readable medium having stored thereon program code executable by a processor of an electronic device, the program code comprising:

code that causes the processor to receive an audio-out signal to be output as audio via a speaker of the electronic device;

code that causes the processor to attempt to recognize a wake word in the audio-out signal using a first recognizer of the electronic device, the first recognizer being a recognizer that includes a first speech recognition model which comprises a first number of speech recognition states or phonemes; and upon recognizing the wake word in the audio-out signal using the first recognizer:

code that causes the processor to monitor, using a reconciliation module of the electronic device, a status of a second recognizer while the audio-out signal is output via the speaker of the electronic device, wherein the second recognizer includes a second speech recognition model which comprises a second number of speech recognition states or phonemes higher than the first number;

code that causes the processor to determine, using the reconciliation module, that the second recognizer has detected the wake word in a mic-in audio signal captured via a microphone of the electronic device at approximately the same time that the audio-out signal was output via the speaker; and in response to the determining, code that causes the processor to transmit, using the reconciliation module, an instruction to a voice command-and-control system of the electronic device to ignore the wake word detected in the mic-in audio signal by the second recognizer.

8. The non-transitory computer readable medium of claim 7 wherein the instruction causes the voice command-and-control system to decline processing of a voice query or command phrase following the wake word in the mic-in audio signal.

9. The non-transitory computer readable medium of claim 7 wherein the audio-out signal is an audio signal or file.

10. The non-transitory computer readable medium of claim 7 wherein the audio-out signal is a text file.

11. The non-transitory computer readable medium of claim 7 wherein the audio-out signal is generated locally on the electronic device.

12. The non-transitory computer readable medium of claim 7 wherein the audio-out signal is received by the electronic device from a remote server.

13. An electronic device comprising:

a speaker;

a microphone;

a processor; and a memory having stored thereon program code which, when executed by the processor, causes the processor to:

receive an audio-out signal to be output as audio via the speaker;

attempt to recognize a wake word in the audio-out signal using a first recognizer that includes a first speech recognition model which comprises a first number of speech recognition states or phonemes; and upon recognizing the wake word in the audio-out signal using the first recognizer:

monitor, using a reconciliation module, a status of a second recognizer while the audio-out signal is output via the speaker of the electronic device, wherein the second recognizer includes a second speech recognition model which comprises a second number of speech recognition states or phonemes higher than the first number;

determine, using the reconciliation module, that the second recognizer detected the wake word in a mic-in audio signal captured via the microphone at approximately the same time that the audio-out signal was output via the speaker; and in response to the determining, transmit, using the reconciliation module, an instruction to a voice command-and-control system of the electronic device to ignore the wake word detected in the mic-in audio signal by the second recognizer.

14. The electronic device of claim 13 wherein the instruction causes the voice command-and-control system to decline processing of a voice query or command phrase following the wake word in the mic-in audio signal.

15. The electronic device of claim 13 wherein the audio-out signal is an audio signal or file.

16. The electronic device of claim 13 wherein the audio-out signal is a text file.

17. The electronic device of claim 13 wherein the audio-out signal is generated locally on the electronic device.

18. The electronic device of claim 13 wherein the audio-out signal is received by the electronic device from a remote server.

* * * * *